(No Model.) 2 Sheets—Sheet 1.
A. GRUENBERG.
RUNAWAY HORSE CHECK.
No. 575,664. Patented Jan. 19, 1897.
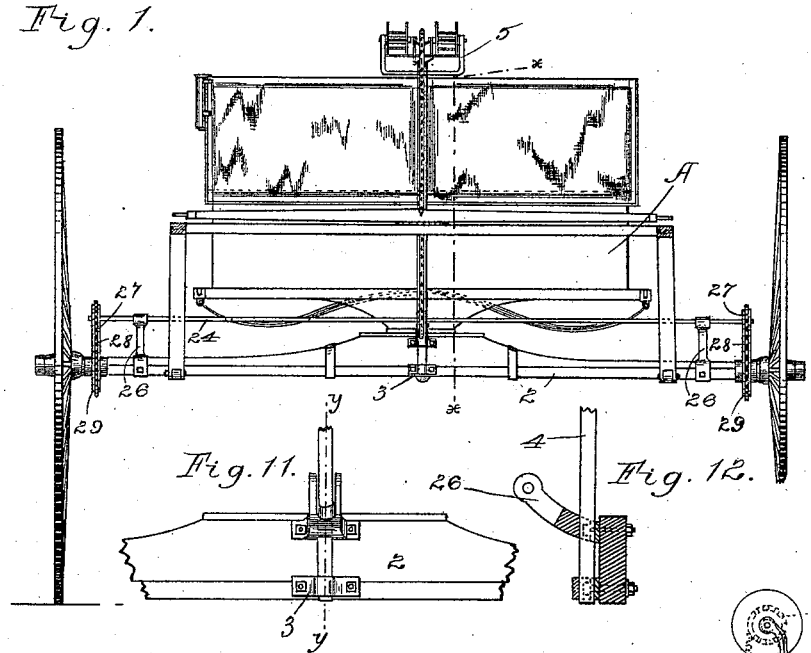
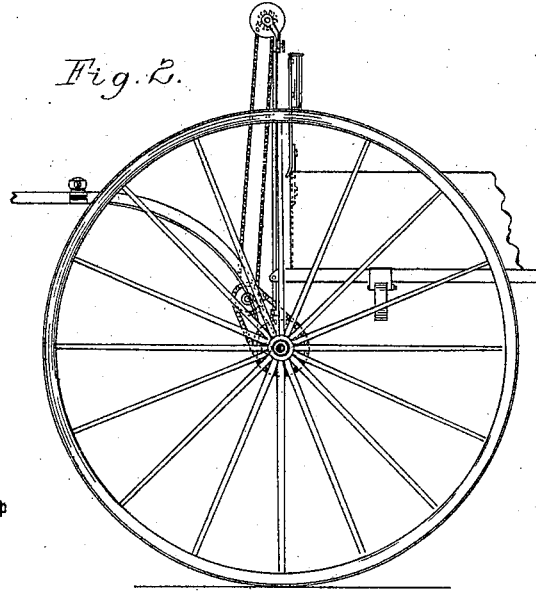
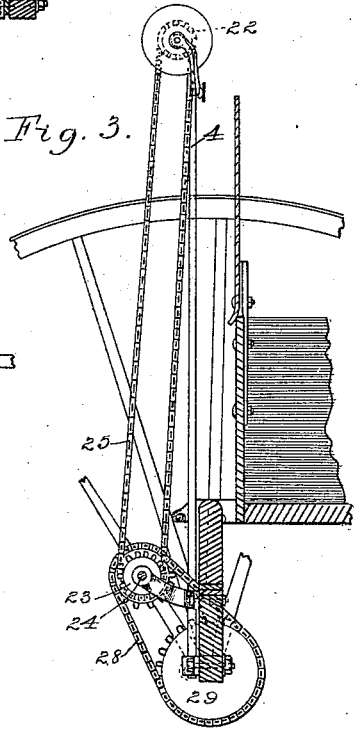
Witnesses:
F. S. Bradbury.
H. S. Johnson.
Inventor:
Aaron Gruenberg
per: Geo. J. Gruenberg
Attorney.
THE NORRIS PETERS CO., PHOTO-LITHO., WASHINGTON, D. C.

(No Model.) 2 Sheets—Sheet 2.
A. GRUENBERG.
RUNAWAY HORSE CHECK.
No. 575,664. Patented Jan. 19, 1897.
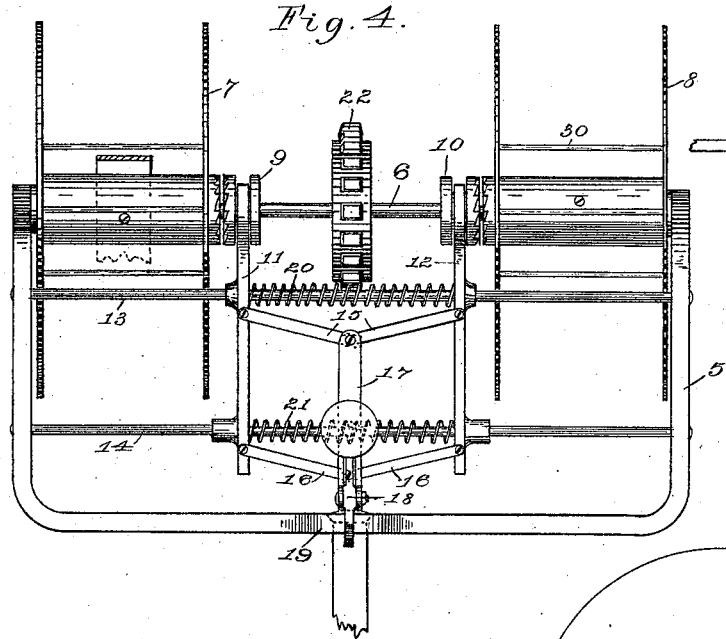
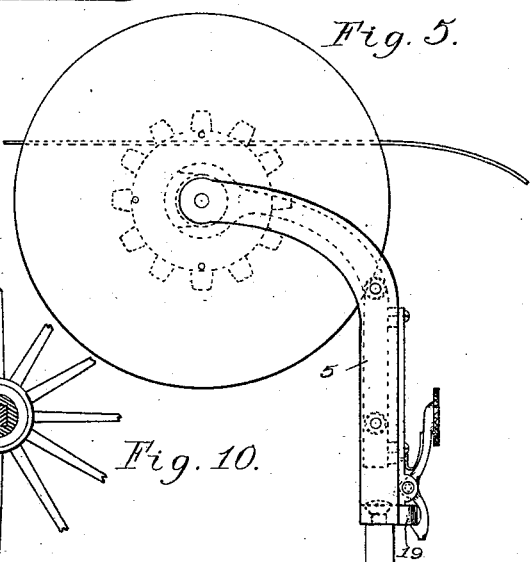
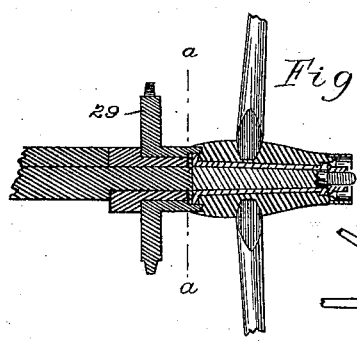
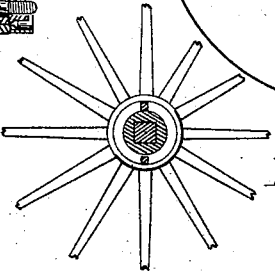
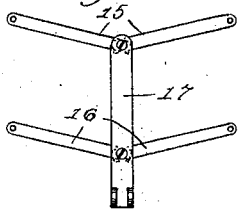
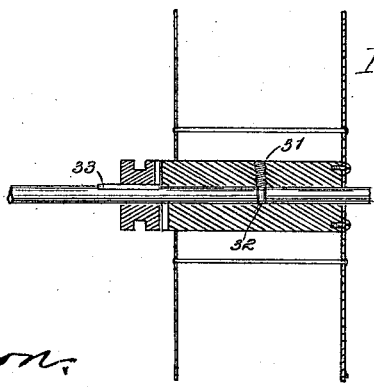
Witnesses:
F. S. Bradbury
H. S. Johnson
Inventor:
Aaron Gruenberg.
per: Geo. J. Gruenberg
Attorney.

UNITED STATES PATENT OFFICE.

AARON GRUENBERG, OF MINNEAPOLIS, MINNESOTA, ASSIGNOR TO GEORGE J. GRUENBERG, OF SAME PLACE.

RUNAWAY-HORSE CHECK.

SPECIFICATION forming part of Letters Patent No. 575,664, dated January 19, 1897.

Application filed September 1, 1894. Serial No. 521,947. (No model.)

*To all whom it may concern:*

Be it known that I, AARON GRUENBERG, a citizen of the United States, residing at Minneapolis, in the county of Hennepin and State of Minnesota, have invented a new and useful Runaway-Horse Check, of which the following is a specification.

My invention relates to improvements in horse-controlling attachments for buggies and similar vehicles; and it consists in providing a new and improved device for that purpose adapted to be attached to the vehicle in such position as to be easily accessible by the driver and having operative connection with the wheels of the vehicle. The device is provided with a pair of rein-holders through which the reins freely pass, the holders normally turning freely upon their shaft, but adapted to be instantly thrown into operative engagement with the wheels by means of suitable clutch mechanism, so as to wind and stop the horses.

In the accompanying drawings, forming part of this specification, Figure 1 is a front elevation of a buggy fitted with my improved attachment. Fig. 2 is a partial side elevation of the same. Fig. 3 is a sectional detail on line $xx$ of Fig. 1. Fig. 4 is a front elevation of the rein-carrying attachments and the clutch mechanism for throwing them into operative connection with the wheels. Fig. 5 is a side elevation of the same. Fig. 6 is a cross-section of one of the rein-holders. Fig. 7 is a detail view of part of the clutch restraining mechanism. Fig. 8 is a detail of two of the brace-arms of the clutch restraining mechanism, showing their pivotal connection. Fig. 9 is a cross-section of the hub of a wheel, showing a sprocket secured thereto by means of which power is transmitted to the winding attachment. Fig. 10 is a section on line $aa$ of Fig. 9. Fig. 11 is a partial front elevation of the axle, showing the manner of connection thereto of the upright standard for supporting the winding attachment. Fig. 12 is a section of the same on line $yy$ of Fig. 11; and Fig. 13 is a detail view of one of the bearings for the shaft intermediate of the wheels and the winding apparatus.

In the drawings, A represents a buggy to which is shown attached my improved device. Connected to the front of the forward axle 2 of the buggy by means of the brace 3 is the upright standard 4, carrying upon its upper end the frame 5. Mounted upon a shaft 6, journaled in this frame, is a pair of rein-carrying reels 7 and 8, turning freely upon the shaft, but held from lateral movement by means of the screw 31, traveling in the grooves 32 in the shaft. Slidably journaled upon the shaft 6 by means of a spline or feather 33 and normally held out of engagement with the reels by means of suitable spring-controlled mechanism are the clutch members 9 and 10, having toothed faces adapted to engage with the similarly-toothed faces of the ends of the reel. The spring-controlled mechanism for holding the clutch members and reels out of engagement is composed of a pair of side bars 11 and 12, engaging with the clutch members 9 and 10 and slidable laterally upon the rods 13 and 14, journaled in the frame 5. The bars 11 and 12 are attached together by means of the pair of brace-arms 15 and 16, pivotally connected to the central beam 17. Secured to the lower end of the central beam 17 is the catch 18, which is adapted to be hooked over a projection 19 upon the bottom of the frame 5, thus pulling the center of the brace-arms downward, thereby drawing the bars 11 and 12 closer together against the tension of the springs 20 and 21 and holding the clutch members from engagement with the reels. When the catch 18 is released, the springs will force the side bars 11 and 12 away from each other and allow the clutch members and the reels to again engage.

Running from a sprocket 22, mounted upon the shaft 6, to the sprocket 23 upon the shaft 24 is the sprocket-chain 25. The shaft 24 runs transversely of the front of the vehicle and has journal-bearings 26 upon the front axle, the central bearing also serving as a support for the upright standard. Upon each end of this shaft 24 is mounted a sprocket 27, operatively connected with the wagon-wheel by means of the chain 28, running from it to a similar sprocket 29, keyed into the end of the wheel-hub.

Operation: As will be evident from the drawings power is being transmitted to the shaft 6 and the clutches keyed thereon at all times when the wheel is revolving. The reins normally pass underneath the bars 30 of the rein-holding reels when driving. When the horse becomes unmanageable and it is desired to stop it, the catch 18 is released, causing the clutch restraining mechanism to act and the clutches to be thrown into engagement with the reels. The reels will then revolve with the clutches and wind the reins upon them until the horse is compelled to stop.

I claim—

1. In an apparatus of the class described, the combination with the shaft having operative connection with the vehicle-wheels, and the reels mounted loosely upon said shaft, of the controlling mechanism secured to said clutches, the springs actuating said controlling mechanism to hold said clutches in engagement with said reels, and the catch upon said controlling mechanism adapted to engage a suitable lug to hold the clutches in disengaged position against the tension of said spring.

2. In an apparatus of the class described, the combination with the reel-carrying shaft independent of the vehicle-axle, and the reels turning freely on said shaft, of the clutches slidably mounted upon said shaft intermediate of said reels, means for simultaneously throwing said clutches into engagement with said reels, means for holding them in disengaged position, the shaft intermediate of said reel-carrying shaft and the running-gear of the vehicle, the connection between said shafts, and the connection between said intermediate shaft and running-gear.

3. In an apparatus of the class described, the combination with the buggy and the reel-carrying frame attached thereto, the reels turning freely upon a shaft mounted in said frame, of the clutches slidably journaled upon said shaft, the spring-controlled mechanism normally holding said clutches out of engagement with said reels, the means for locking said mechanism in restraining position, and the operative connection between said clutches and the running parts of the vehicle.

4. In an apparatus of the class described, the combination with the buggy and the reel-carrying frame connected thereto, the rein-carrying reels turning loosely upon a shaft in said frame, of the clutches having sliding connection with said shaft, the means for throwing said clutches into engagement with said reels, the sprocket keyed to said shaft and the gear connection between said sprocket and other sprockets geared to the wheels of the vehicle.

5. In an apparatus of the class described, the combination with the buggy and the reel-carrying frame attached thereto, the rein-carrying reels turning loosely upon a shaft in said frame, the clutches journaled upon and turning with said shaft, of means for throwing said clutches into engagement with said reels, the shaft intermediate of said reel-carrying shaft and the wheels of the vehicle, the gear connection between said shafts, and the gear connection between said second shaft and the wheels of said vehicle.

Subscribed this the 29th day of August, 1894, at the city of Minneapolis, in the State of Minnesota.

AARON GRUENBERG.

In presence of—
  JNO. H. FIELD,
  C. ALFRED LANDQUIST.